US008336592B2

(12) United States Patent
Sawada et al.

(10) Patent No.: US 8,336,592 B2
(45) Date of Patent: Dec. 25, 2012

(54) PNEUMATIC TIRE AND PROCESS FOR PRODUCING THE SAME

(75) Inventors: Takahiko Sawada, Hiratsuka (JP); Yoshiaki Hashimura, Hiratsuka (JP); Norifumi Kameda, Hiratsuka (JP)

(73) Assignee: The Yokohama Rubber Co., Ltd., Tokyo (JP)

( * ) Notice: Subject to any disclaimer, the term of this patent is extended or adjusted under 35 U.S.C. 154(b) by 447 days.

(21) Appl. No.: 12/377,496

(22) PCT Filed: Oct. 23, 2007

(86) PCT No.: PCT/JP2007/070639

§ 371 (c)(1),
(2), (4) Date: Feb. 13, 2009

(87) PCT Pub. No.: WO2008/053747

PCT Pub. Date: May 8, 2008

(65) Prior Publication Data

US 2009/0320983 A1 Dec. 31, 2009

(30) Foreign Application Priority Data

Oct. 30, 2006 (JP) ................................ 2006-294783

(51) Int. Cl.
*B60C 5/14* (2006.01)

(52) U.S. Cl. ......... 152/511; 152/450; 152/510; 152/564

(58) Field of Classification Search .................. 152/450, 152/501, 510, 511, 512, 525, 564, 565, DIG. 16
See application file for complete search history.

(56) References Cited

U.S. PATENT DOCUMENTS

| | | | | | |
|---|---|---|---|---|---|
| 4,941,523 | A * | 7/1990 | Galante et al. | ................ | 152/543 |
| 5,156,921 | A | 10/1992 | Lin et al. | | |
| 5,280,817 | A * | 1/1994 | Liu et al. | ........................ | 152/454 |
| 5,511,599 | A * | 4/1996 | Willard, Jr. | ................... | 152/454 |
| 5,851,323 | A * | 12/1998 | Kaido et al. | .................. | 152/510 |
| 6,062,283 | A * | 5/2000 | Watanabe et al. | ............. | 152/510 |
| 6,988,522 | B2 * | 1/2006 | Colantonio et al. | .......... | 152/517 |
| 2002/0074077 | A1 * | 6/2002 | Ikeda et al. | ................... | 156/123 |
| 2004/0194862 | A1 * | 10/2004 | Fukutomi et al. | ............. | 152/204 |
| 2006/0042740 | A1 * | 3/2006 | Takahashi et al. | ............ | 152/510 |

FOREIGN PATENT DOCUMENTS

| | | |
|---|---|---|
| JP | A 1-314164 | 12/1989 |
| JP | A 8-217923 | 8/1996 |
| JP | A 11-199713 | 7/1999 |
| JP | A 2005-75010 | 3/2005 |

* cited by examiner

*Primary Examiner* — Joseph Del Sole
*Assistant Examiner* — Seyed Masoud Malekzadeh
(74) *Attorney, Agent, or Firm* — Greer, Burns & Crain, Ltd.

(57) ABSTRACT

A pneumatic tire in which, in employing as an air-impermeable layer a film formed of a thermoplastic resin or a thermoplastic elastomer component obtained by blending a thermoplastic resin with an elastomer, separation of the film during tire production is prevented; and a process for producing the same. The pneumatic tire is obtained by disposing a film closer to a tire cavity than a carcass layer, disposing a first rubber layer closer to the tire cavity than the film so as to cover the film, and disposing ends, in the width direction, of the first rubber layer outward of ends, in the width direction, of the film, the film being formed of a thermoplastic resin or a thermoplastic elastomer composition obtained by blending a thermoplastic resin with an elastomer.

8 Claims, 4 Drawing Sheets

PNEUMATIC TIRE AND PROCESS FOR PRODUCING THE SAME

This application is a U.S. National Phase under 35 U.S.C. §371 of International Application No. PCT/JP2007/070639, filed Oct. 23, 2007.

TECHNICAL FIELD

The present invention relates to a pneumatic tire employing, as an air-impermeable layer, a film formed of a thermoplastic resin or of a thermoplastic elastomer composition obtained by blending a thermoplastic resin with an elastomer, and also relates to a process for producing the same. More specifically, the present invention relates to a pneumatic tire in which separation of the film during production of the tire can be prevented, and also to a process for producing the same.

BACKGROUND ART

In recent years, there has been proposed a pneumatic tire in which a film formed of a thermoplastic resin or of a thermoplastic elastomer composition obtained by blending a thermoplastic resin with an elastomer is disposed, as an air-impermeable layer, in an inner face of a tire (for example, refer to Patent Document 1 and Patent Document 2).

However, when an uncured tire obtained by disposing the above described film in an inner face of the tire is made, the film separates from the inner face of the tire before the curing process due to a contractile force of the film itself in some cases. For this reason, preventing the separation of the film is desired in producing the pneumatic tire including the air-impermeable layer formed of the film.

Patent Document 1: Japanese patent application Kokai publication No. Hei 8-217923

Patent Document 1: Japanese patent application Kokai publication No. Hei 11-199713

DISCLOSURE OF THE INVENTION

Problem to be Solved by the Invention

An object of the present invention is to provide: a pneumatic tire in which, in employing as an air-impermeable layer a film formed of a thermoplastic resin or a thermoplastic elastomer composition obtained by blending a thermoplastic resin with an elastomer, separation of the film during tire production is prevented; and a process for producing the same.

Means for Solving the Problem

A pneumatic tire of the present invention for achieving the above object is characterized in that: a film formed of a thermoplastic resin or of a thermoplastic elastomer composition obtained by blending a thermoplastic resin with an elastomer is disposed closer to a tire cavity than a carcass layer; a first rubber layer is disposed closer to the tire cavity than the film so as to cover the film; and each of ends, in the width direction, of the first rubber layer are disposed outward of each of ends, in the width direction, of the film.

Additionally, a process for producing a pneumatic tire of the present invention for achieving the above object is characterized by including the steps of: forming an uncured tire including a carcass layer; a film formed of a thermoplastic resin or a thermoplastic elastomer composition obtained by blending a thermoplastic resin with an elastomer, the film being disposed closer to a tire cavity than the carcass layer; and a first rubber layer disposed closer to the tire cavity than the film so as to cover the film, in which ends, in a width direction, of the first rubber layer are disposed outward of ends, in the width direction, of the film, and curing the uncured tire.

EFFECT OF THE INVENTION

In the present invention, in employing as an air-impermeable layer a film formed of a thermoplastic resin or a thermoplastic elastomer composition obtained by blending a thermoplastic resin with an elastomer, an uncured tire is made, and the tire is then cured, the uncured tire being formed by disposing a first rubber layer closer to the tire cavity than the film so as to cover the film, in which ends, in a width direction, of the first rubber layer are disposed outward of ends, in the width direction, of the film. Thereby, the first rubber layer prevents inflow of air into a carcass layer side of the film when the tire is in an uncured state, and consequently, separation of the film during production of the tire can be prevented even in a case where a contractile force of the film itself is larger than a contractile force of the carcass layer.

In the present invention, it is preferable that a projection length of the first rubber layer from the end, in the width direction, of the film be at least 3 mm. Thereby, sealing performance effected by the first rubber layer can be sufficiently secured, and separation preventing effect can be enhanced.

It is preferable that, in addition to the above first rubber layer, a second rubber layer be disposed on a carcass layer side of the film, and that at least a part of the film be sandwiched between the first and second rubber layers. Thereby, adhesion of the film to a carcass layer side can be enhanced.

DESCRIPTION OF REFERENCE NUMERALS

Figure 1:
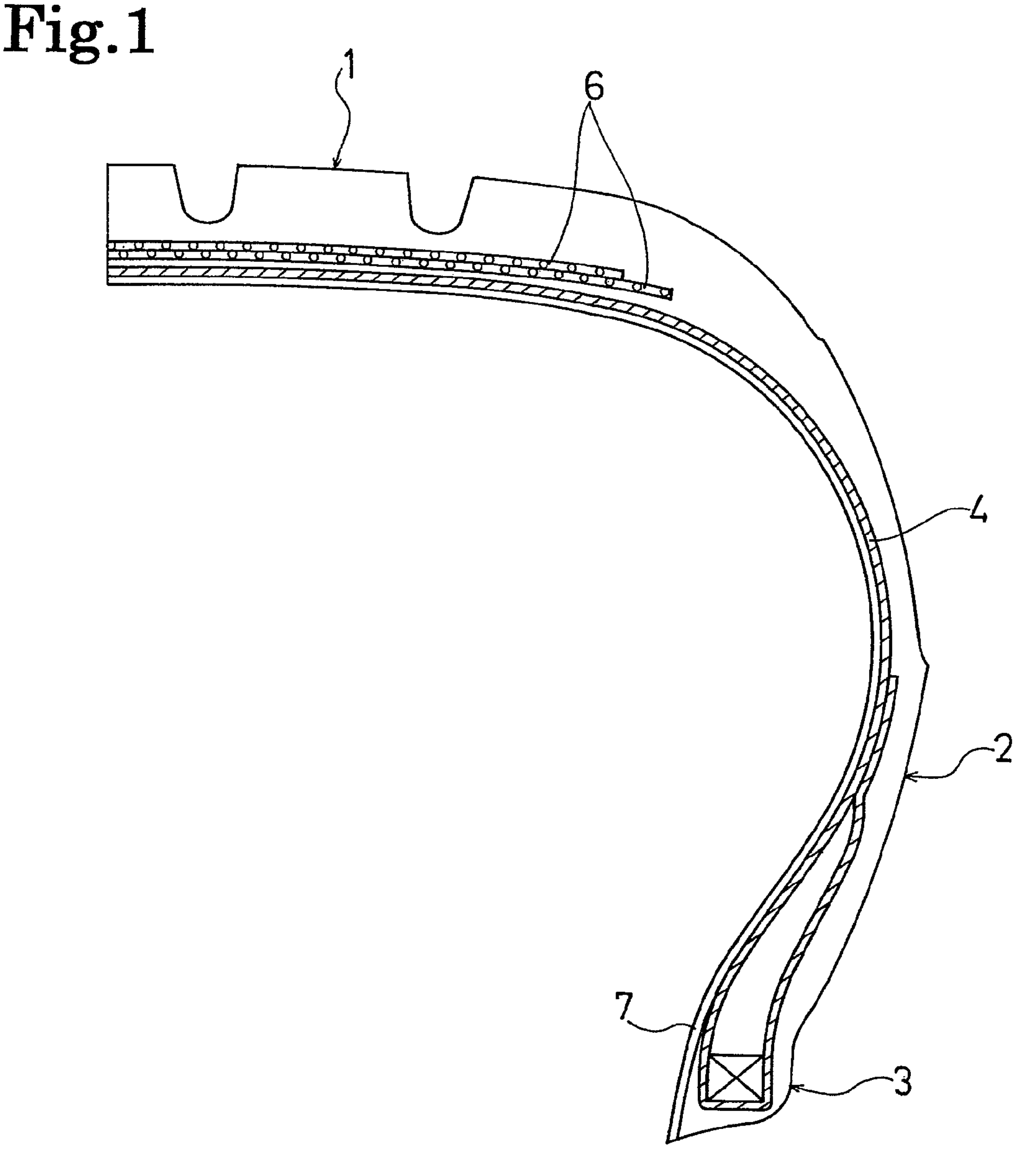
FIG. 1 is a half cross-sectional view taken along a meridian of a pneumatic tire according to an embodiment of the present invention.

| | |
|---|---|
| 1 | tread portion |
| 2 | sidewall |
| 3 | bead portion |
| 4 | carcass layer |
| 5 | bead core |
| 6 | belt layer |
| 7 | air-impermeable layer |
| 11 | film |
| 11e | end, in the width direction, of film |
| 12 | rubber layer (first rubber layer) |
| 12e | end, in the width direction, of rubber layer |
| 13 | rubber layer (second rubber layer) |

BEST MODES FOR CARRYING OUT THE INVENTION

Structures of the present invention will be described below in detail with reference to the accompanying drawings. FIG.

1 shows a pneumatic tire according to an embodiment of the present invention, where: reference numeral 1 denotes a tread portion; reference numeral 2, a sidewall portion; and reference numeral 3, a bead portion. A carcass layer 4 is laid across a pair of the left and right bead portions 3, 3, and end portions of the carcass layer 4 are folded back respectively around bead cores 5 from the inside of the tire to the outside thereof. Multiple belt layers 6 are buried on the outer periphery of the carcass layer 4 in the tread portion 1. In these belt layers 6, reinforcing cords are arranged so as to be tilted with respect to the tire circumferential direction, and so that the reinforcing cords in two adjacent ones of the belt layers 6 cross.

Figure 2:
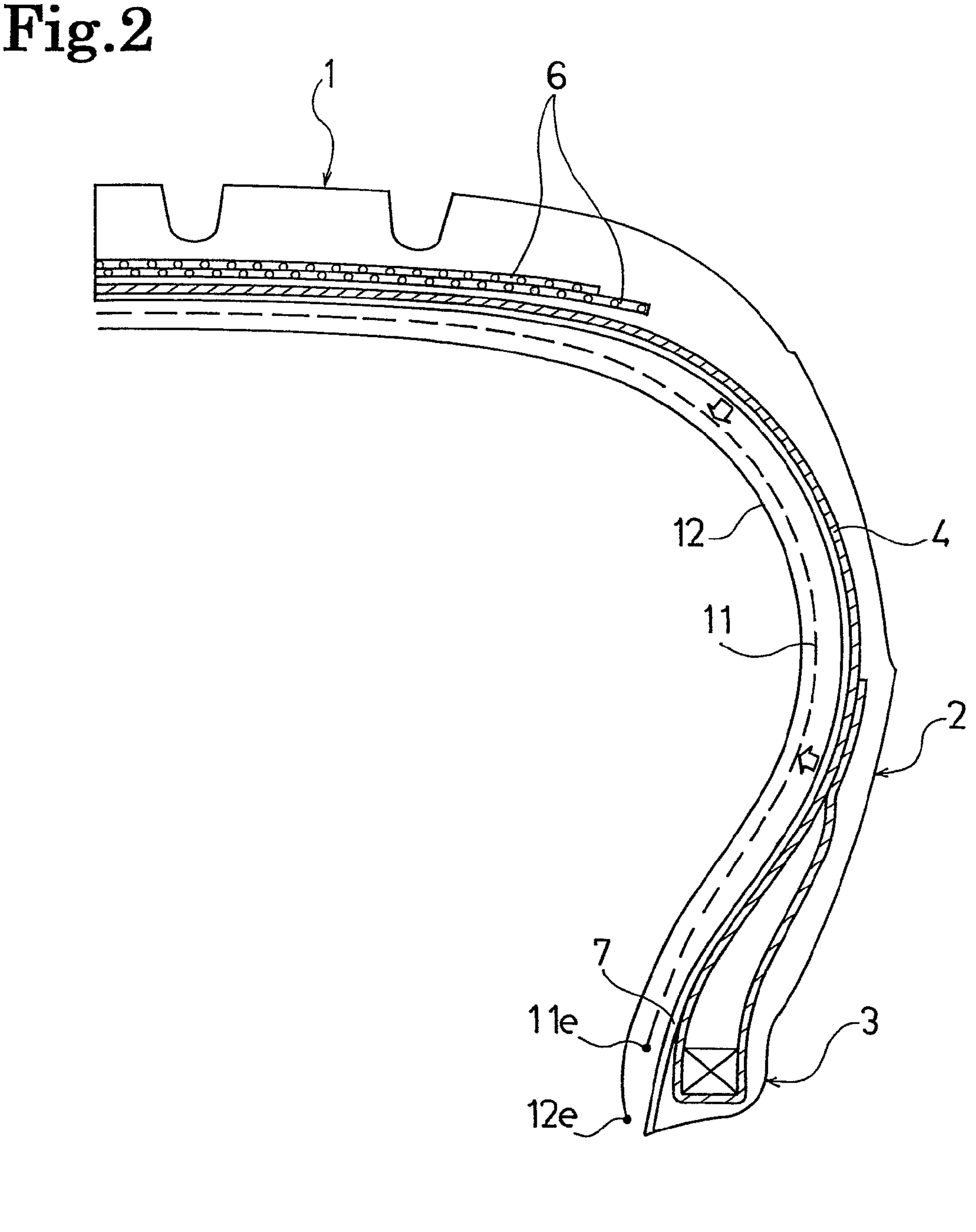
FIG. 2 is a schematic view showing an example of an air-impermeable film of the present invention.
Figure 3:
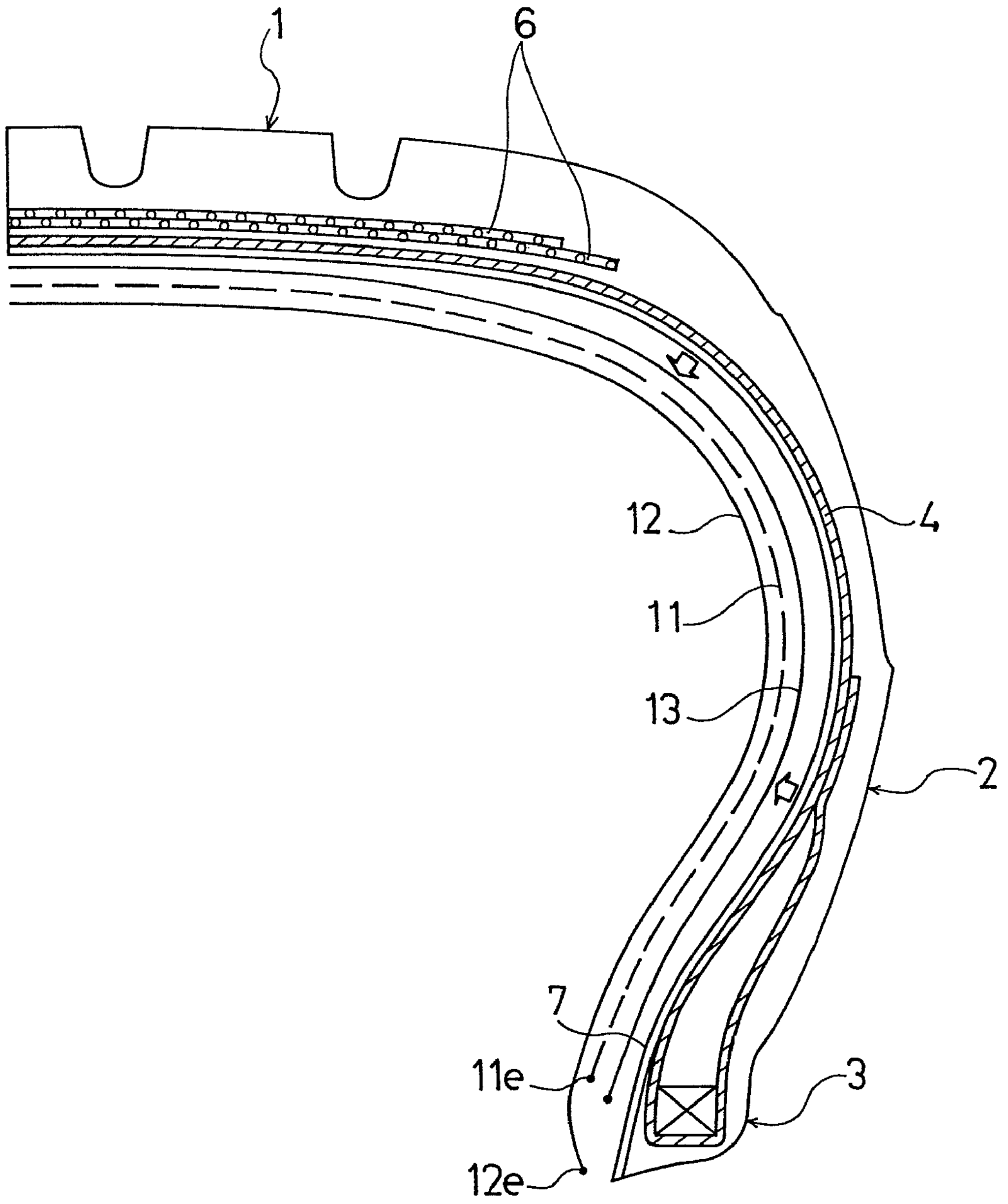
FIG. 3 is a schematic view showing another example of an air-impermeable film of the present invention.
Figure 4A:
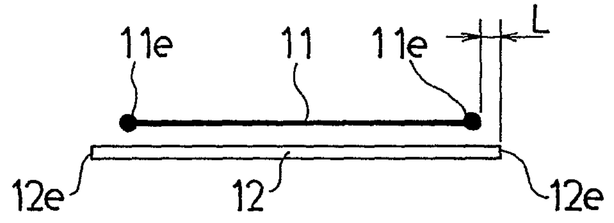
FIGS. 4(*a*) to 4(*e*) are schematic views showing various structures for laminating the film in the present invention.
Figure 4B:
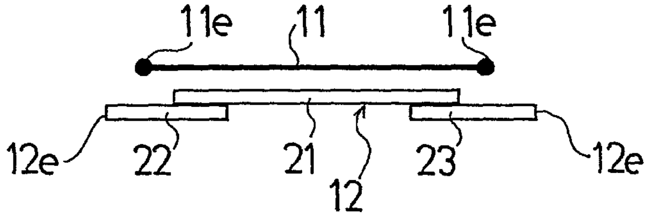
Figure 4C:
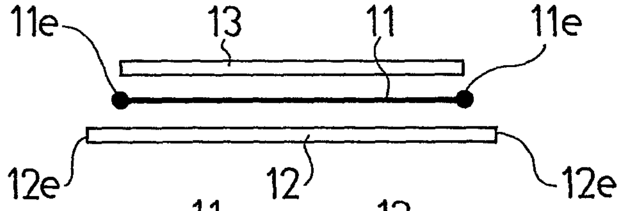
Figure 4D:
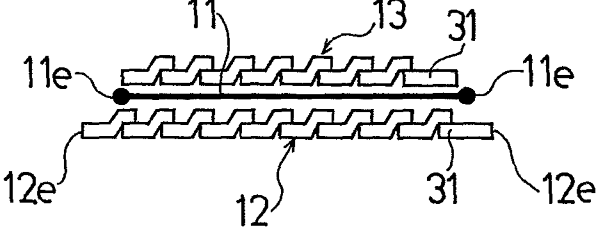
Figure 4E:
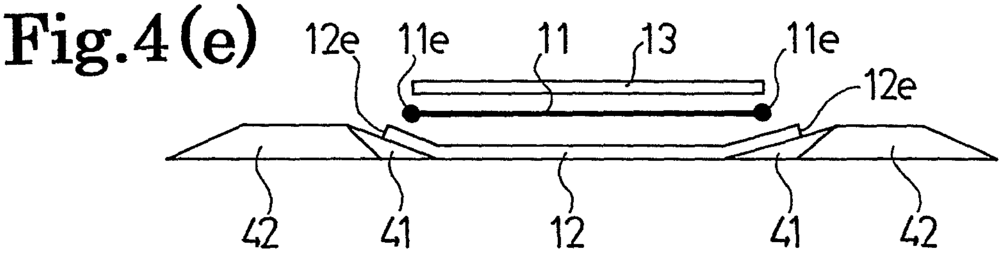

In the above pneumatic tire, an air-impermeable layer 7 is disposed on a tire cavity side of the carcass layer 4. The air-impermeable layer 7, as shown in the schematic view of FIG. 2, includes: a film 11 formed of a thermoplastic resin or a thermoplastic elastomer composition; and a rubber layer 12 (a first rubber layer) laminated closer to the tire cavity than the film 11 so as to cover the film 11. Alternatively, as shown in the schematic view of FIG. 3, the air-impermeable layer 7 may include: the film 11 formed of a thermoplastic resin or a thermoplastic elastomer composition; the rubber layer 12 (the first rubber layer) laminated closer to the tire cavity than the film 11 so as to cover the film 11; and a rubber layer 13 (a second rubber layer) laminated on a carcass layer side of the film 11 so as to cover the film 11. In any one of these cases, ends 12*e*, in the width direction, of the rubber layer 12 are disposed outward of ends 11*e*, in the width direction, of the film 11. That is, the rubber layer 12 covers the ends 11*e*, in the width direction, of the film 11.

The pneumatic tire structured as described above is obtained by: making a primary green tire by disposing, around a forming drum, a laminated body formed of the film 11 and the rubber layer 12, or a laminated body formed of the film 11, the rubber layer 12 and the rubber layer 13, and then attaching thereon tire constituent members such as the carcass layer, bead cores, bead fillers and sidewall rubber together; making a secondary green tire (an uncured tire) by, at the same time as radially expanding the primary green tire into a toroidal shape, attaching thereon the belt layers and a tread rubber together; and thereafter, vulcanizing the secondary green tire.

In employing as an air-impermeable layer the film 11 thus formed of a thermoplastic resin or a thermoplastic elastomer composition, the uncured tire is made, and this tire is then cured, the uncured tire being obtained by disposing the rubber layer 12 on the tire cavity side of the film 11 so as to cover the film 11, and disposing the ends 12*e*, in the width direction, of the rubber layer 12 outward of the ends 11*e*, in the width direction, of the film 11. Thereby, the rubber layer 12 prevents inflow of air to the carcass layer 4 side of the film 11 when the tire is in an uncured state, and consequently, separation of the film during production of the tire can be prevented even in a case where a contractile force of the film 11 is larger than a contractile force of the carcass layer 4. That is, when the tire is in an unvulcanized state, if the ends 11*e* of the film 11 are exposed to the outside, air can flow in between the film 11 and a rubber member adjacent thereto, whereby it becomes easier for the film 11 to separate due to the contractile force of the film 11. In contrast, if the ends 11*e* of the film 11 are sealed by the rubber layer 12, air cannot flow into the interface of the film 11 and the carcass layer, whereby a tightly adhering state of the film 11 is maintained.

FIGS. 4(*a*) to 4(*e*) are schematic views showing various lamination structures of the film. Note that each of FIGS. 4(*a*) to 4(*e*) in schematically shows a section of members disposed around the making drum, the section being taken along a plane including a drum axis.

FIG. 4(*a*) shows the laminated body formed of the film 11 and the rubber layer 12 disposed closer to the tire cavity than the film. It is preferable that a projection length L of the rubber layer 12 from the end 11*e*, in the width direction, of the film 11 be at least 3 mm. If this projection length L is less than 3 mm, it becomes difficult to sufficiently secure sealing performance effected by the rubber layer 12. The projection length L is measured along a shape of the rubber layer 12 in the cured tire. A preferable range of the projection length is 3 to 50 mm, and a more preferable range thereof is 5 to 40 mm.

FIG. 4(*b*) shows the laminated body formed of the film 11 and the rubber layer 12 disposed closer to the tire cavity than the film 11. Here, the rubber layer 12 includes a plurality of rubber layers 21 to 23 into which the rubber layer 12 is divided in a drum axis direction. As each of the rubber layers 22 and 23 respectively disposed on the both ends, in the width direction, of the film 11, for example, a so-called finishing layer in which a plurality of organic fiber cords are buried in rubber can be used. Thus, as the rubber layer 12 disposed closer to the tire cavity than the film 11, any one of a layer constituted only of rubber, and a layer in which cords are buried in rubber can be used.

FIG. 4(*c*) shows the laminated body (a sandwich structure) formed of the film 11, the rubber layer 12 disposed closer to the tire cavity than the film 11, and the rubber layer 13 disposed closer to the carcass layer than the film 11. In addition to the rubber layer 12 disposed closer to a tire cavity than the film 11, the rubber layer 13 is disposed closer to the carcass layer than the film 11, and at least a part of the film 11 is sandwiched between the rubber layers 12 and 13, whereby adhesion of the film 11 to a carcass layer side during the making of the tire can be enhanced.

FIG. 4(*d*) shows the laminated body (a sandwich structure) formed of the film 11, the rubber layer 12 disposed closer to the tire cavity than the film 11, and the rubber layer 13 disposed closer to the carcass layer than the film 11. Here, each of the rubber layers 12 and 13 is formed of strip members 31 wounded around in the tire circumferential direction. Thus, each of the rubber layers 12 and 13 may be formed of only a sheet, or may be constituted of strip members each having a narrow width.

FIG. 4(*e*) shows the laminated body (a sandwich structure) formed of the film 11, the rubber layer 12 disposed closer to the tire cavity than the film 11, and the rubber layer 13 disposed closer to the carcass layer than the film 11. Here, the rubber layer 12 closer to the tire cavity than the film 11 is attached to rim cushion rubber layers 41, and sidewall rubber layers 42 In this case, the rim cushion rubber layers 41 and sidewall rubber layers 42 come to serve for preventing exposure of the ends 11*e* of the film 11.

In the above pneumatic tire, an adhesive layer can be interposed between the film 11 and the rubber layer 12 disposed closer to the tire cavity than the film 11, or between the film 11 and the rubber layer 13 disposed closer to the carcass layer than the film 11. A kind of the adhesive layer is not particularly limited, and it is only necessary that a kind excellent in adhesion both to the film and to the relevant rubber layer be selected.

It is desirable that an air permeability coefficient (a level of air permeation per unit thickness) of the rubber layer 12 disposed closer to the tire cavity than the film 11 be larger than an air permeability coefficient of the film 11. The air permeability coefficients mentioned here are those measured through a measurement method complying with "Plastics—

Film and sheeting—Determination of gas-transmission rate (Method A)" of JIS K 7126, and by use of air as the gas. By using a material relatively high in air permeability for the rubber layer 12 disposed closer to the tire cavity than the film 11, reaction gas generated during the curing process can be allowed to escape toward the cavity of the tire, separation of the film 11 otherwise occurring after the curing process can be prevented. It is preferable that a rubber composition in which a blending quantity of butyl rubber in rubber elements is restricted to be not more than 60% by weight be used for the rubber layer 12 closer to the tire cavity than the film 11. If the blending quantity of butyl rubber exceeds 60% by weight, the air permeability coefficient of the rubber composition becomes smaller.

It is preferable that thickness of the rubber layer 12 disposed closer to the tire cavity than the film 11 be 0.1 to 3.0 mm according to the conditions of the materials at the time of making the tire. If the rubber layer 12 disposed closer to the tire cavity than the film 11 is too thin, an effect of preventing separation of the film 11 becomes insufficient, and, if it is oppositely too thick, it leads to weight increase. On the other hand, although a thickness of the film 11 is not particularly limited, it can be selected from a range of 0.002 to 0.7 mm.

The film used in the present invention will be described below. This film can be formed of a thermoplastic resin or a thermoplastic elastomer composition obtained by blending a thermoplastic resin with an elastomer.

Examples of the thermoplastic resin used in the present invention are: polyamide resins (for example, nylon 6 (N6), nylon 66 (N66), nylon 46 (N46), nylon 11 (N11), nylon 12 (N12), nylon 610 (N610), nylon 612 (N612), nylon 6/66 copolymer (N6/66), nylon Jun. 66, 19610 copolymer (N6/66/610), nylon MXD6, nylon 6T, nylon 6/6T copolymer, nylon 66/PP copolymer, and nylon 66/PPS copolymer), polyester resins (for example, aromatic polyesters such as polybutylene terephthalate (PBT), polyethylene terephthalate (PET), polyethylene isophthalate (PEI), polybutylene terephthalate/tetramethylene glycol copolymer, PET/PEI copolymer, polyarylate (PAR), polybutylene naphthalate (PBN), liquid crystal polyester, and polyoxyalkylene diimide diacid/polybutylene terephthalate copolymer), polynitrile resins (for example, polyacrylonitrile (PAN), polymethacrylonitrile, acrylonitrile/styrene copolymer (AS), methacrylonitrile/styrene copolymer, and methacrylonitrile/styrene/butadiene copolymer), poly(meth)acrylate resins (for example, polymethyl methacrylate (PMMA), polyethyl methacrylate, ethylene/ethyl acrylate copolymer (EEA), ethylene/acrylic acid copolymer (EAA), and ethyl methacrylate resin (EMA)), polyvinyl resins (for example, vinyl acetate (EVA), polyvinyl alcohol (PVA), ethylene/vinyl alcohol copolymer (EVOH), polyvinylidene chloride (PVDC), polyvinyl chloride (PVC), vinyl chloride/vinylidene chloride copolymer, and vinylidene chloride/methyl acrylate copolymer), cellulose resins (for example, cellulose acetate, and cellulose acetate butyrate), fluororesins (for example, polyvinylidene difluoride (PVDF), polyvinyl fluoride (PVF), Polychlorotrifluoroethylene (PCTFE), and ethylene/tetrafluoroethylene copolymer (ETFE)), and imide resins (for example, aromatic polyimide (PI)).

Examples of the elastomer used in the present invention are: diene rubber and hydrogenated products thereof (for example, NR, IR, epoxidized natural rubber, SBR, BR (high cis BR and low cis BR), NBR, hydrogenated NBR, and hydrogenated SBR), olefin rubber (for example, ethylene propylene rubber (EPDM, EPM), and maleic acid modified ethylene propylene rubber (M-EPM)), isobutylene-isoprene rubber (IIR), copolymer of isobutylene and aromatic vinyl or diene monomer, acrylic rubber (ACM), ionomer, halogenated rubber (for example, Br-IIR, Cl-IIR, brominated isobutylene para-methyl styrene copolymer (Br-IPMS), chloroprene rubber (CR), hydrin rubber (CHC, CHR), chlorosulfonated polyethylene (CSM), chlorinated polyethylene (CM), and maleic acid modified chlorinated polyethylene (M-CM)), silicone rubber (for example, methyl vinyl silicone rubber, dimethyl silicone rubber, and methylphenylvinyl silicone rubber), sulfur-containing rubber (for example, polysulfide rubber), fluororubber (for example, vinylidene fluoride rubber, fluorine-containing vinyl ether rubber, tetrafluoro ethylene-propylene rubber, fluorine-containing silicone rubber, and fluorine-containing phosphazene rubber), and thermoplastic elastomers (for example, a styrene elastomer, an olefin elastomer, a polyester elastomer, a urethane elastomer, and a polyamide elastomer) can be listed.

In the thermoplastic elastomer composition used in the present invention, although a composition ratio of a thermoplastic resin component (A) to an elastomer component (B) may be set as appropriate in consideration of balance between a thickness and flexibility of the film, a preferable range thereof is 10/90 to 90/10, and more preferably, 20/80 to 85/15 (by weight).

Into the thermoplastic elastomer composition according to the present invention, other polymers such as a compatibilizer, and a compounding agent can be mixed as third components in addition to the above essential components (A) and (B). The purposes of mixing the other polymers are to improve compatibility between the thermoplastic resin component and the elastomer component, to enhance film making processability of the materials, to improve heat resistance thereof, to reduce manufacturing cost, and the like, and, examples of a material used therefore are polyethylene, polypropylene, polystyrene, ABS, SBS, polycarbonate and the like.

The above thermoplastic elastomer composition is obtained by previously fusing and kneading the thermoplastic resin and the elastomer (uncured one in the case of rubber) by use of a biaxial kneader/extruder or the like, and thereby dispersing the elastomer component in the thermoplastic resin forming a continuous phase. When the elastomer component is cured, elastomer may be dynamically cured by adding a vulcanizing agent during the kneading. Additionally, although various compounding agents (other than a vulcanizing agent) may be added to the thermoplastic resin or elastomer component during the above kneading, it is preferable that these agents be previously mixed therein before the kneading. There is no particular limitation as to a kneader used for the kneading of the thermoplastic resin and the elastomer, and there can be listed a screw extruder, a kneader, a banbury mixer, and a biaxial kneader/extruder as examples of the kneader. For the purpose of kneading of the resin component and a rubber component, and a dynamic curing process of the rubber component, it is preferable that a biaxial kneader/extruder be used among them. Furthermore, the kneading may be sequentially performed by use of plural kinds of kneaders. Among conditions for the fusing and kneading process, as to a temperature, it is only necessary that it should be a temperature at which the thermoplastic resin can be fused. Additionally, it is preferable that a shearing speed during the kneading be 2500 to 7500 $sec^{-1}$. It is preferable that an overall time taken for the kneading be 30 seconds to 10 minutes, and that, in a case where the vulcanizing agent is added, a time taken for the curing process after the addition be 15 seconds to 5 minutes. The thermoplastic elastomer composition produced by the above described method is formed into a film through a molding or calendaring process by a resin extruder. It is only necessary that a method for forming it into a film conform to a usual method for forming a thermoplastic resin or a thermoplastic elastomer into a film.

The thus-obtained thin film of the thermoplastic elastomer composition assumes a structure in which the elastomer is dispersed, as a discontinuous phase, in a matrix of the thermoplastic resin. Such a dispersed structure enables a Young's modulus of the thin film to be set in a range of 1 to 500 Mpa, and hence enables adequate rigidity for a tire constituent member to be provided to the thin film.

While the above thermoplastic resin or thermoplastic elastomer composition can be buried inside the tire in a form of a single sheet or film after being made into the sheet or film, an adhesive layer may be laminated on the sheet or film in order to enhance adhesion to rubber adjacent thereto. Specific examples of an adhesive polymer constituting this adhesive layer are: ultra high molecular weight polyethylene (UHMWPE) having a molecular weight of at least 1,000,000, or more preferably, at least 3,000,000; acrylate copolymer such as ethylene/ethyl acrylate copolymer (EEA), ethylene/mthyl acrylate resin (EMA) and ethylene/acrylic acid copolymer (EAA), and maleic anhydride products thereof; polypropylene (PP), and maleic acid modified products thereof; ethylene propylene copolymer, and maleic acid modified products thereof; polybutadiene resins, and maleic anhydride modified products thereof; styrene-butadiene-styrene copolymer (SBS); styrene-ethylene-butadiene-styrene copolymer (SEBS); thermoplastic fluororesin; and thermoplastic polyester resin. Any one of these can be made into a sheet or film form by being extruded by, for example, a resin extruder in accordance with a usual method. Although a thickness of the adhesive layer is not particularly limited, a thinner thickness is more preferable for weight reduction of the tire, and it is preferable that the thickness be 5 to 150 μm.

While the preferred embodiment of the present invention has been described above in detail, it should be understood that various alterations, substitutions and replacements can be made to the embodiment as long as the alterations, substitutions and replacements do not depart from the spirit and scope of the present invention defined by the scope of the appended claims.

EXAMPLES

Tires of Comparative Examples 1 and 2 and Example 1 to 4 each having a tire size of 205/70R15 were produced. These tires each employed a film formed of a thermoplastic elastomer composition obtained by blending a thermoplastic resin with an elastomer, but were provided with various different structures of the air-impermeable layers.

The tire of Comparative Example 1 was obtained by disposing the film closer to the tire cavity than the carcass layer, disposing a rubber layer closer to the tire cavity than the film, and disposing ends, in the width direction, of the rubber layer at positions 15 mm inward of corresponding ends, in the width direction, of the film. The tire of Comparative Example 2 was obtained by disposing the film closer to the tire cavity than the carcass layer, disposing a rubber layer closer to the tire cavity than the film, and disposing ends, in the width direction, of the rubber layer at the same positions as corresponding ends, in the width direction, of the film.

The tire of Example 1 was obtained by disposing the film closer to the tire cavity than the carcass layer, disposing a rubber layer closer to the tire cavity than the film, and disposing ends, in the width direction, of the rubber layer at positions 3 mm outward of corresponding ends, in the width direction, of the film. The tire of Example 2 was obtained by, while disposing the film closer to the tire cavity than the carcass layer, disposing a rubber layer closer to the tire cavity than the film, and disposing ends, in the width direction, of the rubber layer at positions 10 mm outward of corresponding ends, in the width direction, of the film, interposing another rubber layer between the film and the carcass layer. The tires of Examples 3 and 4 were obtained so as to have the same structure as the one of Example 2, except that projection lengths L of the rubber layer disposed on the tire cavity side of the film were set to 45 mm and 55 mm, respectively. In each of Comparative Examples 1 and 2 and Example 1 to 4, diene rubber was used for the rubber layer disposed closer to the tire cavity than the film, and a thickness thereof was set to 0.5 mm.

After the tires of Comparative Examples 1 and 2 and Example 1 to 4 having the above constitutions were made, the tires were left for three hours, and separation statuses of the films were examined, results of which are shown in FIG. 1. In assessment results, "A" indicates a case where no separation was observed, "B" indicates a case where separation occurred in a part on a circumference of the tire, and "C" indicates a case where separation occurred in an entire region on a circumference of the tire.

TABLE 1

| | Comparative Example 1 | Comparative Example 1 | Example 1 | Example 2 | Example 3 | Example 4 |
|---|---|---|---|---|---|---|
| Presence of Film | Present | Present | Present | Present | Present | Present |
| Presence of Rubber Layer Closer to Tire Cavity than Film | Present | Present | Present | Present | Present | Present |
| Presence of Rubber Layer Closer to Carcass Layer than Film | Absent | Absent | Absent | Present | Present | Present |
| Projection Length L (mm) | −15 | 0 | 3 | 10 | 45 | 55 |
| Separation Status of Film | C | B | A | A | A | A |

As is apparent from this Table 1, no separation of the films was observed in the tires of Examples 1 to 4, separation of the films occurred in the tires of Comparative Examples 1 and 2. Note that, as observed in Examples 3 and 4, a tire weight increases as the projection length L of the rubber layer disposed closer to the tire cavity than the film is made larger.

What is claimed is:

1. A pneumatic tire comprising:

a carcass layer;

a film formed of a thermoplastic resin or a thermoplastic elastomer composition obtained by blending a thermoplastic resin with an elastomer, the film being disposed closer to a tire cavity than the carcass layer; and a first rubber layer disposed closer to the tire cavity than the film so as to cover the film, the pneumatic tire characterized in that ends, in a width direction, of the first rubber layer are disposed outward of ends, in the width direction, of the film, wherein a projection length of the first rubber layer from each of the ends, in the width direction, of the film is set to at least 3 mm, such that sealing performance effected by the first rubber layer can be sufficiently secured, and a separation preventing effect can be enhanced.

2. The pneumatic tire according to claim 1, wherein:

a second rubber layer is disposed between the carcass layer and the film; and at least a part of the film is sandwiched between the first and second rubber layers.

3. A pneumatic tire comprising:

a carcass layer;

a film formed of a thermoplastic resin or a thermoplastic elastomer composition obtained by blending a thermoplastic resin with an elastomer, the film being disposed closer to a tire cavity than the carcass layer; and a first rubber layer disposed closer to the tire cavity than the film so as to cover the film, wherein ends of the first rubber layer are disposed radially inwardly of ends of the film, wherein the ends of the first rubber layer are located adjacent bead portions of the pneumatic tire, and wherein a projection length of the first rubber layer from each of the ends of the film is set to at least 3 mm, such that sealing performance effected by the first rubber layer can be sufficiently secured, and a separation preventing effect can be enhanced.

4. The pneumatic tire according to claim 3, wherein:

a second rubber layer is disposed between the carcass layer and the film; and at least a part of the film is sandwiched between the first and second rubber layers.

5. The pneumatic tire according to claim 3, wherein the ends of the first rubber layer are located inward, in a width direction, of the bead portions of the pneumatic tire.

6. The pneumatic tire according to claim 1, wherein the ends of the first rubber layer are located adjacent and inward, in the width direction, of bead portions of the pneumatic tire.

7. The pneumatic tire according to claim 1, wherein the film is formed of the thermoplastic elastomer composition, and said thermoplastic elastomer composition has a structure in which the elastomer is dispersed, as a discontinuous phase, in a matrix of the thermoplastic resin.

8. The pneumatic tire according to claim 3, wherein the film is formed of the thermoplastic elastomer composition, and said thermoplastic elastomer composition has a structure in which the elastomer is dispersed, as a discontinuous phase, in a matrix of the thermoplastic resin.

* * * * *